United States Patent [19]
Defago et al.

[11] 4,057,388
[45] Nov. 8, 1977

[54] DRY HEAT PROCESS FOR DYEING AND PRINTING ORGANIC MATERIAL WHICH CAN BE DYED WITH CATIONIC DYESTUFFS

[75] Inventors: Raymond Defago, Riehen; Paul Schaffluetzel, Basel; Arnulf Ruediger Lapple, Arlesheim, all of Switzerland; Bernard Hugelin, Gaillard, France

[73] Assignee: Ciba-Geigy AG, Basel, Switzerland

[21] Appl. No.: 675,896

[22] Filed: Apr. 12, 1976

Related U.S. Application Data

[63] Continuation of Ser. No. 416,766, Nov. 19, 1973, abandoned.

[51] Int. Cl.$^2$ .................................................. D06P 5/00
[52] U.S. Cl. ........................................ 8/2.5 A; 8/2.5 R; 106/22; 427/146; 428/457; 428/464; 428/507; 428/537; 428/913

[58] Field of Search ............................... 8/2.5 A, 2.5 R; 427/146; 428/913

[56] References Cited

U.S. PATENT DOCUMENTS

| 1,799,754 | 4/1931 | Lawrence | 8/2.5 X |
| 2,040,075 | 5/1936 | Brower | 8/2.5 X |
| 2,067,435 | 1/1937 | Chatfield et al. | 8/2.5 X |
| 2,634,677 | 4/1953 | Klinkowski et al. | 8/2.5 X |

OTHER PUBLICATIONS

Moore, *JSDC*, Sept., 1974, pp. 318–325.

*Primary Examiner*—Stanford M. Levin
*Attorney, Agent, or Firm*—Wenderoth, Lind & Ponack

[57] ABSTRACT

In a dry heat process for dyeing and printing of organic material which can be dyed with cationic dyestuffs, the improvement wherein at least one transferable salt of a cationic dyestuff with an acid having a $pK_s$ value greater than 3 is used for dyeing and printing.

22 Claims, No Drawings

DRY HEAT PROCESS FOR DYEING AND PRINTING ORGANIC MATERIAL WHICH CAN BE DYED WITH CATIONIC DYESTUFFS

This application is a continuation of application Ser. No. 416,766, filed Nov. 19, 1973, now abandoned.

The present invention relates to a dry heat process for dyeing and printing organic material which can be dyed with cationic dyestuffs, especially polyacrylonitrile and modacryl synthetic fibre material, to the dyeing preparations and auxiliary carriers employed in said process, and to the organic material dyed and printed by the new process.

Transfer printing processes are known which consist in dyeing and printing synthetic fibres, in particular polyester fibres, but also polyacrylonitrile fibres, with disperse dyestuffs which pass over into the vapour state at atmospheric pressure between 150° and 220° C, at temperatures of about 190° to 220° C over the course of from 10 to 60 seconds. By means of this dry heat transfer of disperse dyestuffs from an inert carrier, e.g. paper, to textiles there are obtained, with higher temperatures and longer action of heat, better yields along with improved wet fastness properties of the resulting dyeings.

However, when using polyacrylonitrile fibres there occurs as a rule a distinct and undesirable yellowing and hardening of the fibres under advantageous transfer conditions for disperse dyestuffs, i.e. depending on the duration of action at temperatures of 190° C and over. Furthermore, the resulting dyeings and prints do not have the brilliance that is usually obtained on such materials using cationic dyestuffs. But with disperse dyestuffs there are obtained solely dyeings that are faint, partly of poor fastness, and therefore useless, at temperatures from 120° to 190° C and at very short action times of up to 210° C, i.e. at temperatures that cause virtually no damage to the polyacrylonitrile fibres.

It has also been proposed to use cationic dyestuffs in the form of their free colour bases or salts with strong inorganic acids for dyeing polyacrylonitrile fibers by the transfer printing process. In the form of their colour bases many cationic dyestuffs are unstable, in particular unstable to heat. Only a very limited number of cationic colour bases are therefore suitable for transfer printing. The prints obtained with these heat-stable colour bases on polyacrylonitrile fibres have for the most part unsatisfactory light fastness properties for the requirements of practice.

The ordinary cationic dyestuffs for dyeing polyacrylonitrile fibres by conventional aqueous methods are used principally in the form of their salts with strong inorganic acids, for example as chlorides, bromides, methasulphates, or zinc chloride double salts. The steam pressure of these ordinary dye salts are very low at temperatures below 200° C at atmospheric pressure. Unless steam and moist textile material are used, they produce on polyacrylonitrile fibres faint dyeings or no dyeings at all in the dry transfer printing process at temperatures of 150° to 190° C.

A process has now been found which makes it possible, in simple manner and avoiding the difficulties and disadvantages mentioned hereinabove, to effect on organic material that can be dyed with cationic dyestuffs, in particular synthetic fibre, material from acid modified polyacrylonitrile, dyeings that are dry, deep, and fast, especially fast to light, with cationic dye salts. The new, dry heat process consists in using for dyeing and printing transferable salts of cationic dyestuffs with acids having a $pK_s$ value greater than 3.

The surprising discovery has been made that salts of cationic dyestuff with acids having a $pK_s$ value greater than 3 can be transferred without decomposition at temperatures below 190° C and that with these dye salts there are obtained, by the transfer printing method, on organic material that can be dyed with cationic dyestuffs, dyeings and prints whose fastness properties are the equal of, if not actually superior to, those obtained with the same cationic dyes, e.g. in the form of their salts with strong inorganic acids, from an aqueous bath.

The cationic dyestuffs which can be used according to the invention are in general chromophoric systems whose cationic character derives from a carbonium, ammonium, oxonium, or sulphonium group. Examples of such chromophoric systems are: methine, azomethine, hydrazone, azine, oxazine, thiazine, diazine, xanthene, acridine, polyarylmethane, e.g. diphenylmethane or triphenylmethane, and cumarine dyestuffs with external ammonium group, for example a cycloammonium or alkylammonium group. By cationic dyestuffs are meant also cationic fluorescent whiteners. In this context the fluorescent whiteners in question are chiefly those of the methane, azomethine, benzimidazole, cumarine, naphthalimide, or pyrazoline series.

As defined herein, the cited cationic dyestuffs are used according to the invention in the form of their salts with acids having a $pK_s$ value greater than 3. Both inorganic and organic acids are suitable as acids having a $pK_s$ value greater than 3.

The salts of cationic dyestuffs with acids having a $pK_s$ greater than 3 are for the most part known or they can be manufactured by methods which are known per se. For example, they can be manufactured by neutralisation of cationic dyestuffs in the form of their free base with the corresponding inorganic or organic acids in water and/or solvents. Advantageously, the dye salts used according to the invention are manufactured by double reaction direct from the ordinary commercial forms by mixing the salts of strong inorganic acids or metal halide double salts of cationic dyestuffs with the alkaline earth salts, and advantageously alkali salts, of inorganic or organic acids having a $pK_s$ value greater than 3, in aqueous, aqueous-organic or organic solution or suspension, at temperatures of 20° to 60° C, in equimolar ratios. In this way it is possible to obtain direct ready for use dye preparations and printing inks. If these still contain insoluble constituents, it is advantageous to clarify them by removing the insoluble impurities, e.g. by filtration. If desired, the cationic dye salts used according to the invention can also be obtained from the cited solutions of cationic dyestuffs in the form of their customary inorganic salts or metal halide double salts by means of ion exchangers.

As inorganic acids with a $pK_s$ value greater than 3 there may be cited cyanic acid, thiocyanic acid, hydrocyanic acid, boric acid, phosphoric acid, hydrofluoric acid, sulphurous acid or hydrosulphuric acid.

Suitable organic acids having a $pK_s$ value greater than 3 are aliphatic, cycloaliphatic, aromatic, and heterocyclic carboxylic, sulphonic, and sulphinic acids.

Preferred acids are aliphatic dicarboxylic acids and, above all, monocarboxylic acids with up to 25 carbon atoms, which can optionally contain substituents, such as carboxyl and/or hydroxyl groups, the phenyl group or halogen atoms, such as fluorine, bromine, and, above all, chlorine, in particular formic acid, acetic acid, propionic acid, trimethylacetic acid, acrylic acid, butyric acid, caprylic acid, oleic acid, stearic acid, oxalic acid, succinic acid, fumaric acid, malic acid, tartaric acid, lactic acid, citric acid, phenylacetic acid, or chloroacetic acid.

Suitable aromatic carboxylic acids are primarily monocyclic mono- or polycarboxylic acids, which can contain customary non-ionogenic substituents, in particular halogen, such as fluorine, chlorine, or bromine, alkyl groups with up to 4 carbon atoms, e.g. methyl, alkoxy groups with up to 4 carbon atoms, e.g. methoxy, or the hydroxy group. As examples there may be cited: benzoic acid, toluic acid, xylic acid, chlorobenzoic acid, methoxy-benzoic acid, salicyclic acid, phthalic acid, isophthalic acid, terephthalic acid, trimellitic acid, pyromellitic acid or p-sulphobenzoic acid.

As cycloaliphatic carboxylic acids mention may be made chiefly of hexahydrobenzoic acid or methylhexahydrobenzoic acid.

As heterocyclic carboxylic acids there may be cited pyridinemonocarboxylic or pyridinedicarboxylic acids, citrazinic acid, furfurylcarboxylic acid, thiophenecarboxylic acid, or pyrimidinecarboxylic acid.

Suitable organic sulphonic or sulphinic acids with a $pK_s$ value greater than 3 are aromatic acids, such as benzenesulphonic acid, p-toluenesulphonic acid, benzenesulphonic acid or o-toluenesulphinic acid, and, in particular, aliphatic acids, which can optionally contain substituents, e.g. carboxyl, hydroxyl, or amino groups, e.g. β-hydroxysulphonic and β-aminoethanesulphonic acid, ethanesulphonic, above all methanesulphonic or methanesulphinic acid.

As particularly preferred alkaline earth salts and, above all, alkali salts of inorganic or organic acids having a $pK_s$ value greater than 3, there may be cited: trisodium phosphate ($Na_3PO_4$), sodium tripolyphosphate ($Na_5P_3O_{10}$), sodium pyrophosphate ($Na_4P_2O_7$), sodium phosphite ($Na_2HPO_3$), sodium tetraborate ($Na_2B_4O_7$), sodium metaborate ($NaBO_2$), sodium sulphite ($Na_2SO_3$), sodium sulphide ($Na_2S$), potassium sulphide ($K_2S$), sodium carbonate ($Na_2CO_3$), sodium bicarbonate ($NaHCO_3$), potassium metasilicate ($K_2SiO_3$), potassium chromate ($K_2CrO_4$), sodium fluoride ($NaF$), potassium metaaluminate ($KAlO_2$), potassium iodate ($KIO_3$), sodium cyanide ($NaCN$), sodium cyanate ($NaCNO$), potassium thiocyanate ($KCNS$), also alcoholates, e.g. sodium methanolate, potassium ethanolate, magnesium methanolate, sodium monoethyl glycolate, phenolates and thiphenolates, e.g. sodium and potassium phenolate and thiophenolate, sodium-p-methylphenolate, potassium naphtholate, also sodium methanesulphonate, sodium methanesulphinate, lithium, sodium, or potassium acetate, sodium formate, and sodium lactate.

Suitable salts of cationic dyestuffs with acids having a $pK_s$ value greater than 3 are in particular the carboxylic acid salts of lower aliphatic monocarboxylic acids, such as the formates, acetates, and lactates, the salts of inorganic acids with a $pK_s$ value greater than 3, such as the cyanates, thiocyanates, cyanides, phosphates, phisphites, borates, sulphites, silicates, carbonates, bicarbonates, chromates, fluorides, aluminates, sulphides and iodates, the sulphonic and sulphinic acid salts, such as the methanesulfphonates and methanesulphinates, the alcoholates, such as methanolates or the phenolates or thiophenolates.

Examples of organic materials which can be dyed with cationic dyestuffs, and which can be dyed and/or treated with fluoroescent whiteners according to the present invention, are: tannin-treated cotton, leather, wool, polyamides, such as polyhexamethylenediamine adipate, poly-ε-caprolactam or poly-ω-aminoundecanoic acid, polyesters, such as polyethylene glycol terephthalate or polycyclohexane-dimethylene terephthalate, but above all acid modified synthetic fibres, especially acid modified polyamides, such as polycondensation products of 4,4'-diamino-2,2'-diphenyldisulphonic acid or 4,4'-diamino-2,2'-diphenylalkanedisulphonic acids with polyamide forming starting materials, polycondensation products of monoaminocarboxylic acids or their amide forming derivatives or of dibasic carboxylic acids and diamines with aromatic dicarboxysulphonic acids, e.g. polycondensation products of ε-caprolactam or hexamethylenediammonium adipate with potassium-3,5-dicarboxybenzenesulphonate, or acid modified polyester fibres, for example terephthalic or isophthalic acid, polyhydric alcohols, e.g. ethylene glycol, and 1,2- or 1,3-dihydroxy-3-(3-sodium sulphopropoxy)-propane, 2,3-dimethylol-1-(3-sodium sulphopropoxy)-butane, 2,2-bis-(3-sodium sulphopropoxyphenyl)-propane or 3,5-dicarboxybenzenesulphonic acid or sulphonated terephthalic acid, sulphonated 4-methoxy-benzenecarboxylic acid or sulphonated diphenyl-4,4'-dicarboxylic acid. Preferred, however, are polyacrylonitrile fibres (containing at least 85% acrylonitrile) and modacryl fibres. In the polymerisation of acrylonitrile and comonomers, persulphate radicals (deriving from the usual catalyst systems) consisting of potassium persulphate, potassium metasulphite and ferriammonium sulphate, are built into the chain ends as regulators. In addition to acrylonitrile, other vinyl compounds are normally used as comonomers, e.g. vinylidene chloride, vinylidene cyanide, vinyl chloride, methacrylic amide, vinyl pyridine, methylvinyl, pyridine, N-vinylpyrrolidone, vinyl acetate, vinyl alcohol, methylmethacrylate, styrenesulphonic acid or vinylsulphonic acid.

Provided the devices suitable for the purpose are available, the fibre material dyed or treated with fluorescent whiteners according to the invention can be any in desired form, for example in the form of flocks, slubing, yarn, texturised fibres, woven fabrics, knitted fabrics, non-wovens from fibres, ribbons, webs, textile floor coverings, such as woven needle felt carpets or hanks of yarn which can be in the form of webs or are cut or ready finished, but also in the form of sheets. The fibre material can also be in the form of fibre blends or blended fabrics.

The process according to the invention can, for example, be carried out in the following way: printing inks which contain at least one salt of a cationic dyestuff with an acid having a $pK_s$ value greater than 3, optionally a binder which is stable below 230° C, water, and/or an organic solvent, are applied to an inert carrier and dried. The treated side of the carrier is brought into contact with the surface of the organic material to be dyed, then carrier and material are subjected to a heat treatment at 120° to 210° C, advantageously at 170° to 190° C, for 5 to 60 seconds, advantageously 10 to 40 seconds, and the dyed material is then removed from the carrier.

A particular embodiment of the process according to the invention consists in carrying out the double reaction in situ direct by the application of dry heat during the heat transfer process, and by using printing inks which consist of a finely ground mixture of a salt of a strong inorganic acid or of a metal halide double salt of a cationic dyestuff and an alkaline earth salt, or an alkali salt, of an acid having a $pK_s$ value greater than 3, e.g. in the form of a suspension, and optionally of a binder which is stable below 230° C, in a hydrophobic organic solvent, e.g. perchloroethylene, and otherwise carrying out the process as described hereinbefore.

The inert intermediate or auxiliary carrier required for the dry heat transfer, i.e. a carrier for which the dye salts use according to the invention have no affinity, is advantageously a flexible, preferably stable sheet material, such as a ribbon, strip, or a foil with appropriately smooth surface, which is stable to heat and can consist of the most varied kinds of material, above all non-textile material, e.g metal, such as an steel, aluminium paper or plastic foil, or an endless of ribbon of stainless steel, preferably pure non-lacquered cellulose parchment paper which can optionally be coated with a film of vinyl resin, ethyl cellulose, polyurethane resin, or teflon.

The printing inks used according to the invention contain in addition to the salt of a cationic dyestuff, if necessary, also at least one binder that is stable below 230° C and acts as thickener for the printing batch and as at least temporary binder of the dyestuff on the carrier to be printed. Suitable as such binders are synthetic, semi-synthetic, and natural resins, i.e. both polymerisation and polycondensation and polyaddition products. In principle, it is possible to use all resins and binders customarily used in the printing ink and paint industry. The binders should not melt at the transfer temperature, react chemically in the air or with themselves (e.g. cross-link), have little or no affinity for the dye salts used, solely maintain the cationic dye salts at the printed area of the inert carrier without changing it, and remain on the carrier in their entirety after the heat transfer process. Preferred binders are those that are soluble in organic solvents and that dry rapidly for example in a warm current of air and form a film on the carrier. Suitable water-soluble binders are: alginate, tragacanth, carubin (from locust bean gum), dextrin, more or less etherified or esterified mucilages, hydroxyethyl cellulose or carboxymethyl cellulose, water-soluble polyacrylic amides, or above all, polyvinyl alcohol: and suitable binders that are soluble in organic solvents are cellulose esters, such as nitrocellulose, cellulose acetate or butyrate, and, in particular, cellulose ethers, such as methyl, ethyl, propyl, isopropyl, benzyl, hydroxypropyl, or cyanoethyl cellulose, as also mixtures thereof.

When using dispersions, the dye salts dispersed in the printing ink must have principally a particle size of $\leq 10\mu$, preferably $\leq 2\mu$.

Besides water, practically all water-miscible and water-immiscible organic solvents or solvent mixtures are suitable which boil at atmospheric pressure at temperatures below 220° C, preferably below 150° C, and which have sufficient solubility or emulsifiability (dispersibility) for the dye salts and binders used. The following may be cited as examples of suitable organic solvents: aliphatic and aromatic hydrocarbons, e.g. n-heptane, cyclohexane, petroleum ether, benzene, xylene or toluene, halogenated hydrocarbons, such as methylene chloride, trichloroethylene, perchloroethylene or chlorobenzene, nitrated aliphatic hydrocarbons, such as nitropropane, aliphatic amides, such as dimethyl formamide or mixtures thereof, also glycols, such as ethylene glycol or ethylene glycol monoalkyl ethers, e.g. ethylene glycol monoethyl ether, diethyl carbonate, dimethyl carbonate, or esters of aliphatic monocarboxylic acids, e.g. ethyl acetate, propyl acetate, butyl acetate, β-ethoxyethyl acetate, aliphatic or cycloaliphatic ketones, for example methyl ethyl ketone, methyl isobutyl ketone, cyclohexanone, isophoron, mesityl oxide, or diacetone alcohol and alcohols, e.g. methanol, ethanol, and, preferably, n-propanol, isopropanol, n-butanol, tert. butanol, sec. butanol, or benzyl alcohol; also suitable are mixtures of the cited solvents, e.g. a mixture of methyl ethyl ketone and ethanol in the ratio 1:1.

Particularly preferred solvents are esters, ketones, or alcohols which boil below 120° C, e.g. butyl acetate, acetone, methyl ethyl ketone, ethanol, isopropanol, or butanol. Virtually anhydrous printing inks are used with advantage.

The desired viscosity of the printing inks can be adjusted by addition of the cited binders, or by dilution with water or a suitable solvent.

The liquid, pasty, or dry dyeing preparations contain in general 0.01 to 80, advantageously 1 to 30, percent by weight of at least one or more salts of cationic dyestuffs with acids having a $pK_s$ value greater than 3, and optionally 0.5 to 50 percent by weight of a binder, based on the total weight of the preparation, and can be used direct or after dilution as printing inks for use according to the invention.

If desired, disperse dyestuffs can be used in admixture with the dye salts in the process according to the invention. These disperse dyestuffs can belong to the most diverse classes, e.g. to the azo or anthraquinone series; but quinophthalone dyestuffs, nitro dyestuffs, azomethine dyestuffs, styryl dyestuffs and the like are also suitable. It is advantageous to use dyestuffs which pass over into the vapour state to about 60% in less than 60 seconds under atmospheric pressure between 160° and 220° by sublimation or evaporation. As examples of such dyestuffs there may be mentioned the monoazo dyestuffs of the formula

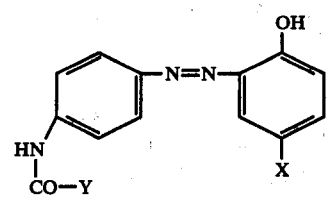

wherein X and Y each represents a low molecular alkyl radical with 1 to 4 carbon atoms.

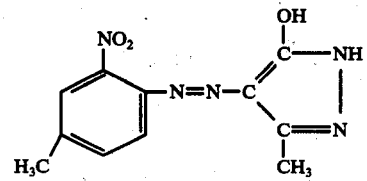

and

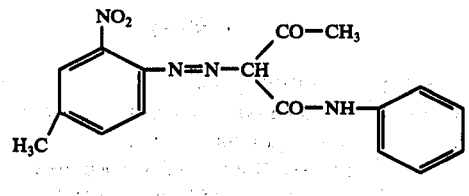

and, above all, the quinophthalone dyestuff e.g. of the formula

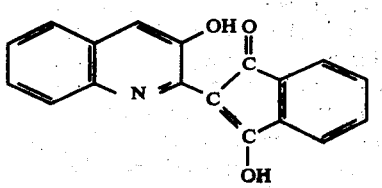

and the anthraquinone dyestuffs of the formula

A,
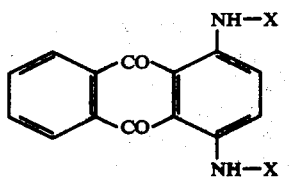

(X = alkyl with 1 to 4 carbon atoms),

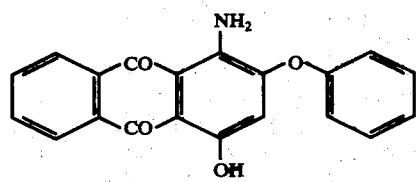

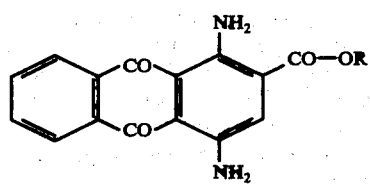

(R = alkyl with 3 to 4 carbon atoms),

C,
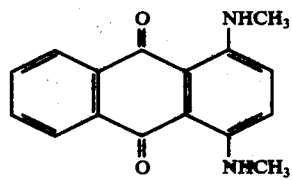

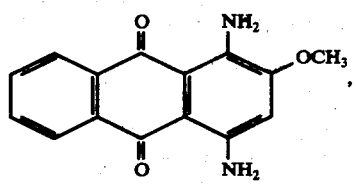

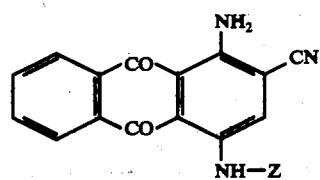

(Z = cyclohexyl or phenyl),
as well as the brominated or chlorinated 1,5-diamino-4,8-dihydroxy-anthraquinones.

The mixture ratio of the dye salts as defined herein is not limited in the disperse dyestuffs. Advantageously, however, the amount of disperse dyestuff is less than 50%.

The suitability of the printing inks can be improved by adding optional components, for example plasticisers, swelling agents, high boiling solvents such as e.g. tetralin or decalin, iogenic or non-ionogenic surface active compounds, for example the condensation product of 1 mol of octylphenol with 8 to 10 mols of ethylene oxide.

The dyeing preparations and printing inks (solutions, dispersions emulsions) used according to the invention can be manufactured by methods which are known per se, by dissolving or dispersing the salts of cationic dyestuffs with acids having a pK$_s$ value greater than 3 in water and/or a solvent or a solvent mixture or they can be manufactured in situ, advantageously in the presence of a binder which is stable below 230° C.

The optionally filtered printing inks are applied to the inert carrier for example by spraying, coating, or advantageously by printing the carrier on parts of the surface or over the entire surface. It is also possible to apply a multicoloured pattern or to print successively in a base shade and subsequently with similar or different patterns.

After the printing inks have been applied to the inert carrier, these are then dried, e.g. with the aid of a flow of warm air or by infrared irradiation optionally with recovery of the solvent employed.

The intermediate carriers can also be printed on both sides, whereby it is possible to select dissimilar colours and/or patterns for both sides. In order to avoid using a printing machine, the printing inks can be sprayed on to the auxiliary carrier, for example by using a spray gun. Particularly interesting effects are obtained if more than one shade is printed or sprayed on to the auxiliary carrier simultaneously. Furthermore, specific patterns can be obtained for example by using stencils or artistic patterns by using a brush. If the auxiliary carriers are printed, the most diverse forms of printing methods can be employed, for example relief printing (e.g. letterpress printing, flexoprinting), intaglio printing (e.g. roller printing), silkscreen printing (e.g. rotary printing, film printing) or electrostatic printing.

The transfer is performed in the conventional manner by the action of heat. The treated auxiliary carriers are brought into contact with the textile materials and kept at 120° to 210° C until the dye salts applied to the auxiliary carrier are transferred to the textile material. As a rule 5 to 60 seconds suffice for this.

The heat can be applied in various known ways, e.g. by passage through a hot heater drum, a tunnel-shaped heating zone or by means of a heated cylinder, advantageously in the presence of an unheated or heated counter-cylinder which exerts pressure or of a hot calender, or also by means of a heated plate (iron or warm press which has been preheated by steam, oil, infrared irradiation or microwaves to the required temperature optionally under vacuum, or which are in a preheated heating chamber.

Upon completion of the heat treatment the printed goods are removed from the carrier. The printed material requires no after treatment, neither a steam treatment to fix the dyestuff nor washing to improve the fastness properties.

Compared with known processes, the process according to the invention has notable advantages. It has in particular the principal advantage of the now largely solved problem of achieving deep, brilliant dyeings and prints which are fast to wet treatments and light and of powerful whitening effects on polyacrylonitrile fibres while maintaining optimum mechanical fibre properties. Compared with prints which are obtained in known manner with cationic dyestuffs, the prints obtained by the new process are characterised by sharply dilineated, finely etched contours. They are more brilliant and faster, in particular more fast to sublimation, than those that are obtained with disperse dyestuffs.

The following Examples illustrate the invention but do not in any way limit the scope thereof. Parts and percentages are by weight.

EXAMPLE 1

1 g of the formula

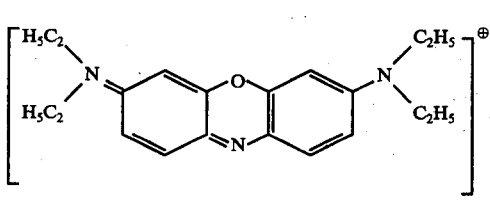

(in commercial form) and 4 g of sodium acetate are added to 12 ml of methyl alcohol, thoroughly mixed for 30 minutes at 20° to 25° C, and the solution is then filtered.

The resulting deep blue printing ink is applied to the entire surface of a strip of paper by spraying, printing, or coating, and subsequently dried. A polyacrylonitrile fabric (ORLON) is then placed on the thus treated intermediate carrier, whereupon carrier and fabric are brought into contact for 60 seconds at 190° C using a heated heating plate. A second non-heated plate guarantees uniform contact. The fabric is then removed from the carrier.

In this way there is obtained a deep, blue coloured polyacrylontrile fabric with excellent wet fastness and good light fastness properties.

A practically non-dyed polyacrylonitrile fabric is obtained by proceeding as described in the above Example but using 4 ml of acetic acid instead of 4 g of sodium acetate.

EXAMPLE 2

0.3 g of the dyestuff of the formula

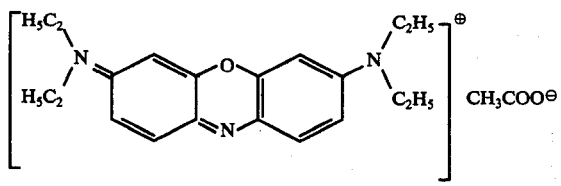

is dissolved in 3 ml of methanol and the solution is filtered. The resulting blue printing ink is applied over the entire surface of a stainless steel carrier by coating and subsequently dried. A polyacrylonitrile fabric (Acrylan Regular, Type 36) is placed on the thus pretreated carrier and carrier and fabric are kept in contact for 10 seconds at a temperature of 210° C using an ironing press. The fabric is then removed from the carrier.

A polyacrylonitrile fabric which is dyed a deep blue colour is obtained in this way. The blue dyeing has excellent wet and light fastness.

EXAMPLE 3

1 g of the dyestuff of the formula

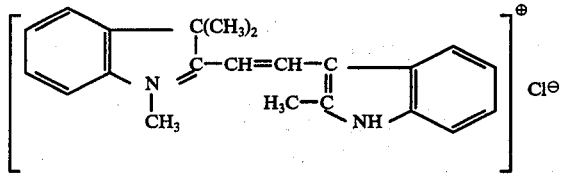

(in commercial form), 6 ml of methanol, 2 ml of water, and 4 g of sodium acetate are thoroughly mixed with stirring.

A brilliant orange dyeing on polyacrylonitrile fabric with excellent wet and light fastness properties is obtained by carrying out the procedure as described in Example 1.

EXAMPLE 4

0.3 g of the dyestuff of the formula

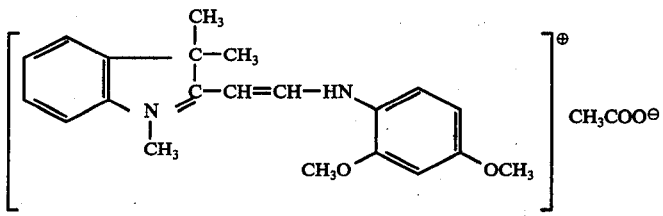

is dissolved with stirring in 10 ml of a mixture consisting of 10 parts of ethyl cellulose (Ethocel E 7, Dow Chem.), 15 parts of ethanol, and 45 parts of methyl ethyl ketone and the solution is filtered.

A pattern is produced on an aluminium foil with the resulting yellow printing ink by the roller printing method using a colour furnisher and dried. A piece of knitted polyacrylonitrile fabric is placed on the printed foil and carrier and material are brought into contact for 30 seconds at 180° C using a calender.

A true reproduction of the yellow pattern on the polyacylonitrile fabric is obtained by otherwise carrying the procedure as described in Example 1, the lines remaining sharp and clear. The yellow dyeing has excellent wet fastness and good fastness to light. inks By using corresponding amounts of one of the carboxylic acid salts listed in the following Table instead of the carboxylic acid salt of a cationic dyestuff indicated in Examples 2 and 4, and by otherwise carrying out the procedure with the printing inks as described in Examples 1 to 4, there are also obtained on polyacrylonitrile fibres deep dyeings and prints, which are fast to wet treatments and light, in the shades indicated in the last column of the Table.

TABLE

| Ex. No. (I) | Dye Salt (II) | Shade on polyacrylonitrile (III) |
|---|---|---|
| 5 | [Phenyl-thiadiazole-N=N-phenyl-N(C$_2$H$_5$)-C$_2$H$_4$-N$^+$(CH$_3$)$_3$]$^{\oplus}$ C$_{18}$H$_{37}$COO$^{\ominus}$ | red |
| 6 | [2-methylphenyl-N(CH$_3$)-C(=C(CH$_3$)$_2$)-CH=CH-NH-C$_6$H$_4$-OCH$_3$]$^{\oplus}$ CH$_3$COO$^{\ominus}$ | brilliant yellow |
| 7 | [(C$_2$H$_5$)$_2$N-phenyl=N-phenyl(CH$_3$)(NH$_2$)(NH$_2$)-O- bridge]$^{\oplus}$ CH$_2$–CH$_2$COO$^{\ominus}$ / OH | blue |
| 8 | [1,3,3-trimethylindoline-2-CH=CH-C$_6$H$_4$-N(CH$_3$)$_2$]$^{\oplus}$ CH$_3$COO$^{\ominus}$ | pink |
| 9 | [1,3,3-trimethylindoline-2-CH=CH-C$_6$H$_4$-N(CH$_2$CH$_3$)$_2$]$^{\oplus}$ HCOO$^{\ominus}$ | red |
| 10 | [(H$_5$C$_2$)$_2$N-phenyl=N-phenyl-NH-C$_6$H$_5$, O-bridge]$^{\oplus}$ HCOO$^{\ominus}$ | blue |
| 11 | [Phenyl-thiadiazole-N=N-C$_6$H$_4$-N(C$_2$H$_5$)(C$_2$H$_4$-pyridinium)]$^{\oplus}$ CH$_3$COO$^{\ominus}$ | scarlet |

TABLE-continued

| Ex. No. (I) | Dye Salt (II) | Shade on polyacrylonitrile (III) |
|---|---|---|
| 12 | [anthraquinone with NH₂ and NH-C₆H₄-CH₂N(CH₃)₃]⁺ CH₃COO⁻ | blue |
| 13 | [O₂N-C₆H₃(Cl)-N=N-C₆H₄-N(C₂H₅)(C₂H₄N⁺(CH₃)₂CH₂C₆H₅)]⁺ CH₃COO⁻ | red |
| 14 | [CH₃O-benzothiazole(N-CH₃)-C-N=N-C₆H₄-N(CH₃)(C₆H₅)]⁺ CH₃COO⁻ | blue |
| 15 | [CH₃O-benzothiazole(N-C₂H₅)-C-N=N-C₆H₄-N(CH₃)₂]⁺ CH₃COO⁻ | blue |
| 16 | [indole derivative with C(CH₃)₂-CH=CH-NH-C₆H₃(OCH₃)(OCH₃)]⁺ CH₂COO⁻/CH₂COOH | yellow |
| 17 | [triazole(N-CH₃)(N-CH₃)-C-N=N-C₆H₄-N(C₂H₅)₂]⁺ HCOO⁻ | red |
| 18 | [(H₃C)₂N-C₆H₄-C(C₆H₅)=C₆H₄=N⁺(CH₃)₂ with second (H₃C)₂N-C₆H₄]⁺ C₁₇H₃₃COO⁻ | green |

| I Ex. No. | II Dye Salt | III Shade on polyacrylonitrile |
|---|---|---|
| 19 | [triphenylmethane dye with four N(CH₃)₂ groups]⁺  CH₃—CH(OH)—COO⁻ | violet |
| 20 | [triphenylmethane dye with H₂N, =NH₂, NH₂ groups]⁺  CH₃COO⁻ | red |
| 21 | [triphenylmethane dye with N(C₂H₅)₂ groups and o-COOH phenyl]⁺  CH₃COO⁻ | bluish-red |
| 22 | [dye with o-Cl phenyl, N(CH₃)(C₆H₅), and N-methylindole groups]⁺  CH₃COO⁻ | green |
| 23 | [dye with N(C₂H₅)₂ groups on bromo-naphthalene]⁺  HCOO⁻ | blue |
| 24 | Mixture consisting of 1 part of the dyestuff of the formula given in Example 1 and 2 parts of the dyestuff of the formula given in Example 6. | green |

EXAMPLE 25

1 g of the dyestuff of the formula

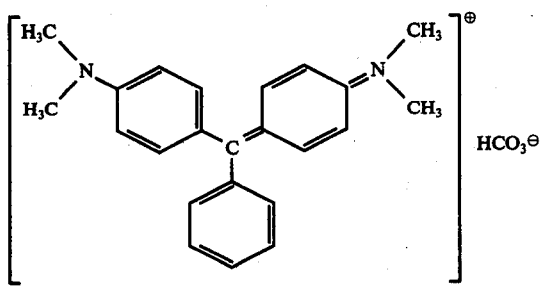

6 ml of methanol, 2 ml of acetic acid (80%), and 4 ml of water are thoroughly mixed with stirring for 1 hour. The resulting and filtered solution is applied, by coating, to paper coated with Teflon and subsequently dried. Knitted fabric or modacryl (Orlon Type 44 or Zefran Type 100) weighing 200 g/m² is placed on the treated carrier and carrier and material are then heated for 30 secondds to 190° while being kept in close contact. The dyed knitted fabric is then removed from the carrier.

A green dyed knitted modarcyl fabric with good wet fastness properties is obtained in this way.

EXAMPLE 26

1 g of the optical brightener of the formula

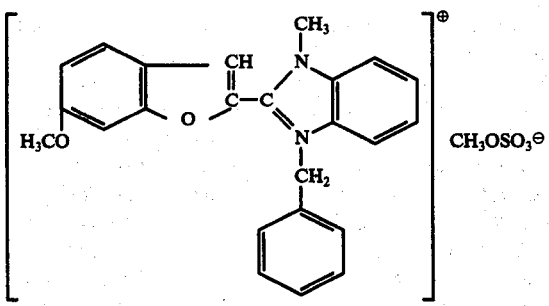

6 ml of methanol, 4 g of sodium acetate (cryst.), and 4 ml of water are thoroughly mixed with stirring for 1 hour. The resulting and filtered solution is applied, by coating, to paper coated with Teflon and subsequently dried. Polyacrylonitrile fabric weighing 200 g/m² is placed on the treated carrier and carrier and material are heated for 30 seconds to 190° C while being kept in close contact. The whitened material is then removed from the carrier.

Whitened knitted fabric with good overall fastness properties is obtained in this way.

EXAMPLE 27

1 g of the dyestuff of the formula

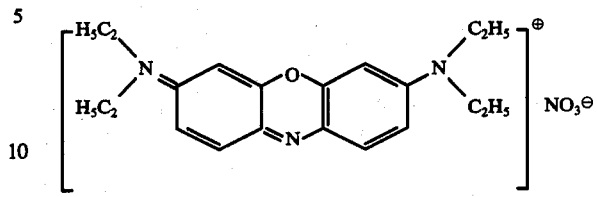

(in commercial form) and 4 g of sodium cyanate are added to 12 ml of methyl alcohol, thoroughly mixed for 30 minutes at 20° to 25° C, and the solution is then filtered.

The resulting deep blue printing ink is applied to the entire surface of a strip of paper by spraying, printing, or coating and subsequently dried. A polyacrylonitrile fabric (ORLON) is placed on the pretreated intermediate carrier, whereupon carrier and material are brought into contact for 60 seconds at 190° C by using a heated heating plate. A second nonheated plate guarantees uniform contact. The fabric is then removed from the carrier. A polyacrylonitrile fabric which is dyed a deep blue shade of excellent wet and light fastness is obtained in this way.

EXAMPLE 28

0.3 g of the dyestuff of the formula

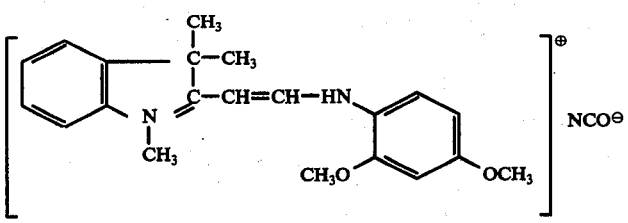

is dissolved with stirring in 10 ml of a mixture consisting of 10 parts of ethyl cellulose (Ethocel E 7, Dow Chem.), 15 parts of ethanol, and 45 parts of methyl ethyl ketone, and filtered.

A pattern is produced on an aluminium foil with the resulting yellow printing ink by the roller printing method using a colour furnisher and dried. A piece of knitted polyacrylonitrile fabric is placed on the printed foil and carrier and material are brought into contact for 30 seconds at 180° C using a calender.

A true reproduction of the yellow pattern on the polyacrylonitrile fabric is obtained by otherwise carrying out the procedure as described in Example 27, the lines remaining sharp and clear. The yellow dyeing has excellent wet fastness and good fastness to light.

EXAMPLE 29

1 g of the dyestuff of the formula

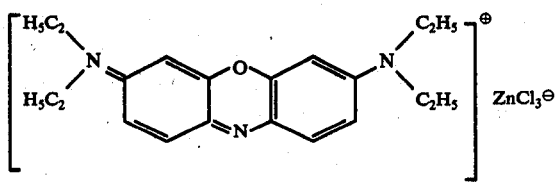

(in commercial form) and 4 g of CH₃—SO₂—ONa are added to 12 ml of methyl alcohol, thoroughly mixed for 30 minutes with stirring at 20° to 25° C, and the solution is then filtered.

The resulting deep blue printing ink is applied to the entire surface of a paper strip by spraying, printing, or coating, and subsequently dried. A polyacrylonitrile fabric (ORLON) is placed on the pretreated intermediate carrier, whereupon carrier and material are brought into contact for 60 seconds at 190° C using a heated heating plate. A second non-heated plate guarantees uniform contact. The dyed fabric is then removed from the carrier.

A polyacrylonitrile fabric dyed a deep blue with excellent wet fastness and good light fastness properties is obtained in this manner.

EXAMPLE 30

1 g of the dyestuff of the formula

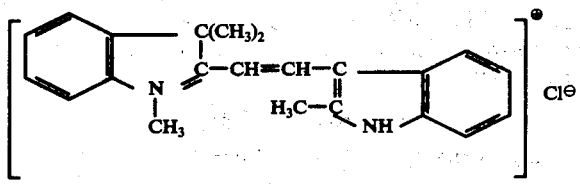

(in commercial form), 6 ml of methanol, 2 ml of water, and 2 g of sodium methanesulphinate are thoroughly mixed with stirring.

A brilliant orange dyeing on polyacrylonitrile fabric with excellent wet fastness and good light fastness properties is obtained by otherwise carrying out the procedure as described in Example 29.

EXAMPLE 31

1 g of the dyestuff of the formula

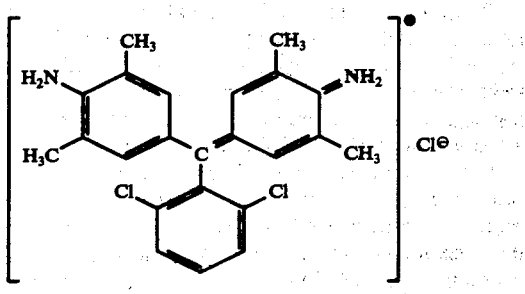

(in commercial form), 6 ml of methanol, 2 ml of water, and 3 g of trisodium phosphate are thoroughly mixed with stirring.

A brilliant blue dyeing on polyacrylonitrile fibric with excellent wet fastness and good light fastness properties is obtained by otherwise carrying out the procedure as described in Example 29.

EXAMPLE 32

1 g of the dyestuff of the formula

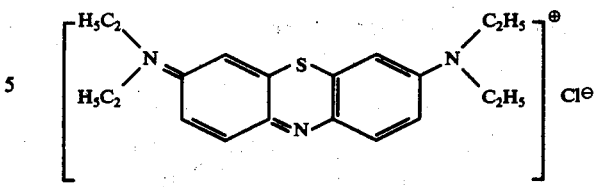

(in commercial form), 6 ml of methanol, 2 ml of water, and 1.5 g of sodium tetraborate are thoroughly mixed with stirring.

A brilliant blue dyeing on polyacrylonitrile fabric with excellent wet fastness and good light fastness properties is obtained by otherwise carrying out the procedure as described in Example 29.

EXAMPLE 33

1 g of the dyestuff of the formula

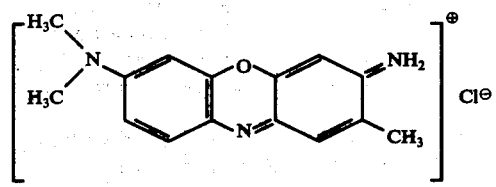

(in commercial form), 5 ml of isopropanol, 1 ml of methyl ethyl ketone, 2 ml of water, and 2 g of potassium chromate are thoroughly mixed with stirring.

A brilliant blue dyeing on polyacrylonitrile fabric with excellent wet fastness and good light fastness properties is obtained by otherwise carrying out the procedure as described in Example 1.

Brilliant blue dyeings on polyacrylonitrile fabric with similarly good fastness properties are also obtained by using corresponding amounts of sodium metaborate, sodium phosphite, sodium bicarbonate, sodium sulphide, or sodium fluoride, instead of the 2 g of potassium chromate indicated in the Example, and by otherwise carrying out the procedure as described in Example 1.

Blue dyeings with similarly good fastness properties are obtained by using 8 ml of water instead of the solvent mixture indicated in the Example, and by otherwise carrying out the procedure as described in Example 1. Brilliant blue dyeings on polyacrylonitrile fabric with excellent wet fastness and good light fastness properties are also obtained by using instead of the solvent mixture indicated in the Example a mixture consisting of 80% ethanol and 20% ethylene glycol monomethyl ether and instead of 2 g of potassium chromate corresponding amounts of sodium ethylate, potassium methylate, sodium phenolate, sodium hexanolate, sodium cresolate, sodium thiophenolate, lithium acetate sodium formate, or sodium lactate, and by otherwise carrying out the procedure as described in Example 1.

Deep dyeings and prints, which are faster to wet processing and light, are also obtained on polyacrylonitrile fabric in the shades indicated in the last column of the Table by using instead of the cationic dyestuffs indicated in the Example corresponding amounts of one of the dye salts listed in the Table and by otherwise carrying out the procedure as described in Example 1.

TABLE

| No. | Dye Salt | Shade on PAC |
|---|---|---|
| 34 | 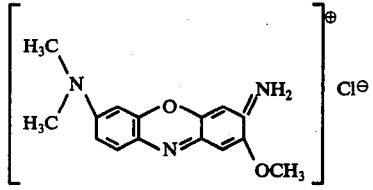 | blue |
| 35 | 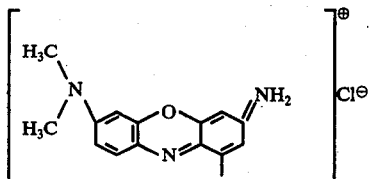 | blue |
| 36 | 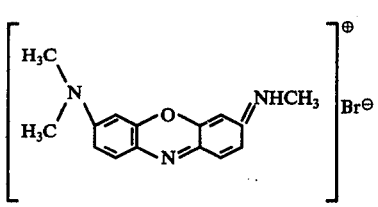 | blue |

EXAMPLE 37

0.3 g of the dyestuff of the formula

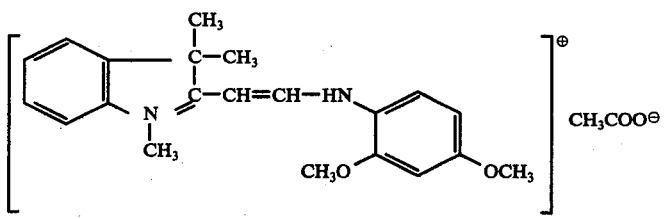

and 0.1 g of the dyestuff of the formula

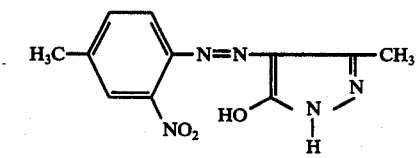

are suspended with stirring in 10 ml of a mixture consisting of 10 parts of ethyl cellulose (Ethocel E 7, Dow Chen.), 15 parts of ethanol, and 45 parts of methyl ethyl ketone.

A pattern is produced on an aluminium foil with the resulting yellow printing ink by the roller printing method using a colour furnisher, and dried. A polyacrylonitrile knitted fabric is placed on the printed foil and carrier and material are brought into contact for 30 seconds at 200° C. By otherwise carrying out the procedure as described in Example 1, there is obtained a true reproduction of the yellow pattern on the polyacrylonitrile knitted fabric, the lines remaining sharp and clear. The yellow dyeing has excellent wet fastness and good light fastness.

EXAMPLE 38

1 g of the dyestuff of the formula

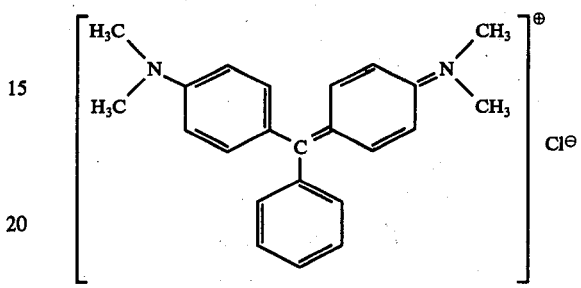

1 g of trisodium phosphate, and 0.5 g of ethyl cellulose (Ethocel E 7, Dow Chem.), are ground for 4 hours in 18 g of perchloroethylene. The resulting suspension is applied to cellulose parchment paper by coating and subsequently dried. A polyacrylonitrile fabric is placed on the treated carrier and carrier and material are heated for 30 seconds to 180° C while being kept in close contact. The fabric is then removed from the carrier.

A green dyed knitted fabric with good fastness properties is obtained in this manner.

EXAMPLE 39

A deep blue dyeing on polyacrylonitrile knitted fabric of excellent wet and light fastness is obtained by carrying out the procedure as described in Example 39 but using instead of the indicated dyestuff 1 g of the dyestuff of the formula

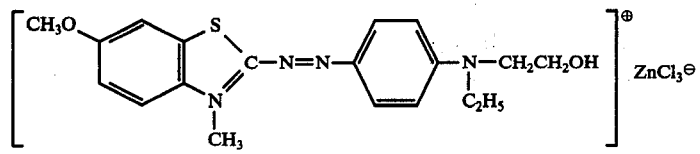

and instead of 1 g of trisodium phosphate 1 g of calcined sodium carbonate.

We claim:

1. In a dry heat transfer printing process which comprises
   A. bringing a treated face of an auxiliary carrier into contact with the surface of an organic material to be dyed, the treated face of the auxiliary carrier being dry and bearing at least one color layer which contains dyestuff which passes into the vapor state under the transfer process conditions, B. subjecting the carrier and the material while contacted to the action of heat for a sufficient time to effect transfer of the vaporizable dyestuff from the auxiliary carrier to the organic material to be dyed, and C. separating the organic material from the auxiliary carrier, the improvement according to which at least one color layer of the said auxiliary carrier contains at least one transferable salt of a cationic dyestuff with an acid having a $pK_s$ value greater than 3.

2. A process according to claim 1, wherein at least one printing ink which contains at least one salt of a cationic dyestuff with an acid having a $pK_s$ value greater than 3, optionally a binder which is stable below 230° C, water and/or an organic solvent, is applied to an inert carrier and dried, the treated side of the carrier is brought into contact with the surface of the organic material to be dyed, the carrier and material are subjected to the action of heat for 5 to 60 second at 120° to 210° C, and the dyed material is removed from the carrier.

3. A process according to claim 2, wherein as cationic dye salt there is used a salt of a lower aliphatic monocarboxylic or dicarboxylic acid.

4. A process according to claim 3, wherein as cationic dye salt there is used a salt of a lower aliphatic monocarboxylic acid.

5. A process according to claim 4, wherein the salt of a lower aliphatic monocarboxylic acid is selected from the group consisting of formates, acetates and lactates.

6. A process according to claim 4, wherein a salt of an inorganic acid having a $pK_s$ value greater than 3 is used.

7. A process according to claim 6, wherein a cyanuric acid salt of a cationic dyestuff is used.

8. A process according to claim 6 wherein the salt is a member of the group consisting of cyantes, thiocyanates and cyanides.

9. A process according to claim 6, wherein the salt is a member of the group consisting of phosphates, phosphites, borates, sulphites, silicates, carbonates, bicarbonates, chromates, fluorides, aluminates, sulphides and iodates.

10. A process according to claim 2, wherein a sulphonic or sulphinic acid salt of a cationic dyestuff is used.

11. A process according to claim 10 wherein a methanesulphonate or methanesulphinate is used.

12. A process according to claim 2, wherein an alcoholate, phenolate, or thiophenolate of a cationic dyestuff is used.

13. A process according to claim 2, wherein the printing ink consists of at least one salt of a strong inorganic acid or of a metal halide double salt of a cationic dyestuff and an alkaline earth or alkali salt of an acid having a $pK_s$ value greater than 3, and optionally an organosoluble binder which is stable below 230° C, in the form of a suspension in a hydrophobic organic solvent.

14. A process according to claim 13, wherein the printing ink contains as alkali salt of an acid having a $pK_s$ value greater than 3, trisodium phosphate, sodium tripolyphosphate, sodium pyrophosphate, sodium phosphite, sodium tetraborate, sodium metaborate, sodium sulphite, potassium metasilicate, sodium carbonate, sodium bicarbonate, potassium chromate, sodium fluoride, sodium sulphide, potassium sulphide, potassium iodate, sodium cyanide, sodium cyanate, potassium thiocyanate, sodium methanesulphate, sodium methanesulphinate, lithium, sodium or potassium acetate, sodium formate, sodium lactate, sodium methanolate, potassium ethanolate, sodium or potassium phosphate or thiphosphate.

15. A process according to claim 13, wherein the printing ink contains in addition at least one disperse dyestuff which passes over into the vapour state to at least 60 % in less than 60 seconds at atmospheric pressure between 160° and 220° C.

16. A process according to claim 2, wherein polyacylonitrile or modacryl fibers are used as organic material which can be dyed with cationic dyestuffs.

17. A process according to claim 2, wherein the inert carrier and the organic material to be dyed are subjected to the action of heat for 10 to 40 seconds at 170° to 190° C.

18. An auxiliary carrier for carrying out the dry heat process according to claim 2, which comprises an inert, flexible, heat stable sheet material having applied to at least one face thereof at least one dyeing preparation comprising at least one salt of a strong inorganic acid or of a metal halide double salt of a cationic dyestuff and an alkaline earth alkali salt of an acid having a $pK_s$ value greater than 3 and optionally a binder which is stable below 230° C in the form of a suspension in a hydrophobic orgainc solvent.

19. An auxiliary carrier for carrying out the dry heat process according to claim 13, which comprises an inert, flexible, heat stable sheet material having applied to at least one face thereof at least one printing ink comprising at least one salt of a strong inorganic acid or of a metal halide double salt of a cationic dyestuff and an alkaline earth alkali salt of an acid having a $pK_s$ value greater than 3, and optionally a binder which is stable below 230° C in the form of a suspension in a hydrophobic organic solvent.

20. An auxiliary inert carrier according to claim 18, which consists of paper an aluminum foil or steel.

21. An auxiliary carrier according to claim 20, wherein cellulose parchment paper is employed.

22. An auxiliary carrier according to claim 18, which is treated with at least one organic printing ink which contains a cellulose ether or ester as binder, or with at least one aqueous printing ink which contains polyvinyl alcohol as binder.

* * * * *

UNITED STATES PATENT AND TRADEMARK OFFICE
CERTIFICATE OF CORRECTION

PATENT NO. : 4,057,388

DATED : November 8, 1977

INVENTOR(S) : RAYMOND DEFAGO, PAUL SCHAFFLUETZEL, ARNULF RUEDIGER LAPPLE and BERNARD HUGELIN It is certified that error appears in the above-identified patent and that said Letters Patent are hereby corrected as shown below:

In the heading of the patent, item "[73]" should read as follows:

--Ciba-Geigy AG, Basle, Switzerland and

Sublistatic Holding S. A., Glarus, Switzerland--

In the heading of the patent, the following item should be included:

--[30]  Foreign Application Priority Data

December 1, 1972   Switzerland   17539/72

January 3, 1973    Switzerland   45/73

March 14, 1973     Switzerland   3734/73

October 5, 1973    Switzerland   14258/73

Signed and Sealed this

Ninth Day of May 1978

[SEAL]

Attest:

RUTH C. MASON
Attesting Officer

LUTRELLE F. PARKER
Acting Commissioner of Patents and Trademarks